(12) United States Patent
Tsuji

(10) Patent No.: US 10,429,948 B2
(45) Date of Patent: Oct. 1, 2019

(54) ELECTRONIC APPARATUS AND METHOD

(71) Applicant: TOSHIBA CLIENT SOLUTIONS CO., LTD., Koto-Ku, Tokyo (JP)

(72) Inventor: Kazuhiko Tsuji, Hamura Tokyo (JP)

(73) Assignee: TOSHIBA CLIENT SOLUTIONS CO., LTD., Tokyo (JP)

( * ) Notice: Subject to any disclaimer, the term of this patent is extended or adjusted under 35 U.S.C. 154(b) by 0 days.

(21) Appl. No.: 15/371,093

(22) Filed: Dec. 6, 2016

(65) Prior Publication Data

US 2017/0168594 A1 Jun. 15, 2017

Related U.S. Application Data

(60) Provisional application No. 62/266,543, filed on Dec. 11, 2015.

(51) Int. Cl.
*G06F 3/041* (2006.01)
*G06F 3/0346* (2013.01)
*G06F 3/044* (2006.01)
*G06F 1/16* (2006.01)

(52) U.S. Cl.
CPC .......... *G06F 3/0346* (2013.01); *G06F 1/1616* (2013.01); *G06F 1/1654* (2013.01); *G06F 3/044* (2013.01); *G06F 3/0412* (2013.01); *G06F 2200/1614* (2013.01)

(58) Field of Classification Search
None
See application file for complete search history.

(56) References Cited

U.S. PATENT DOCUMENTS

| 2004/0227730 | A1 | 11/2004 | Sugihara |
| 2005/0104848 | A1 | 5/2005 | Yamaguchi et al. |
| 2013/0113731 | A1 | 5/2013 | Yoo et al. |

FOREIGN PATENT DOCUMENTS

| JP | 2004-310659 | 11/2004 |
| JP | 2005-100084 | 4/2005 |
| JP | 2006-072872 | 3/2006 |
| JP | 2013-069297 | 4/2013 |

*Primary Examiner* — Brian M Butcher
(74) *Attorney, Agent, or Firm* — Rutan & Tucker, LLP

(57) ABSTRACT

According to one embodiment, an electronic apparatus including a first body and a second body is provided. The second body is mechanically attachable to the first body in a first style and a second style. The electronic apparatus includes a memory and a hardware processor connected to the memory. The hardware processor is configured to detect whether the electronic apparatus is in the first or second style, and validate an operation of changing an orientation of a screen image displayed on the display and limit the validation of the operation to a certain time period during from a time of the second style being detected to a predetermined time passed.

17 Claims, 12 Drawing Sheets

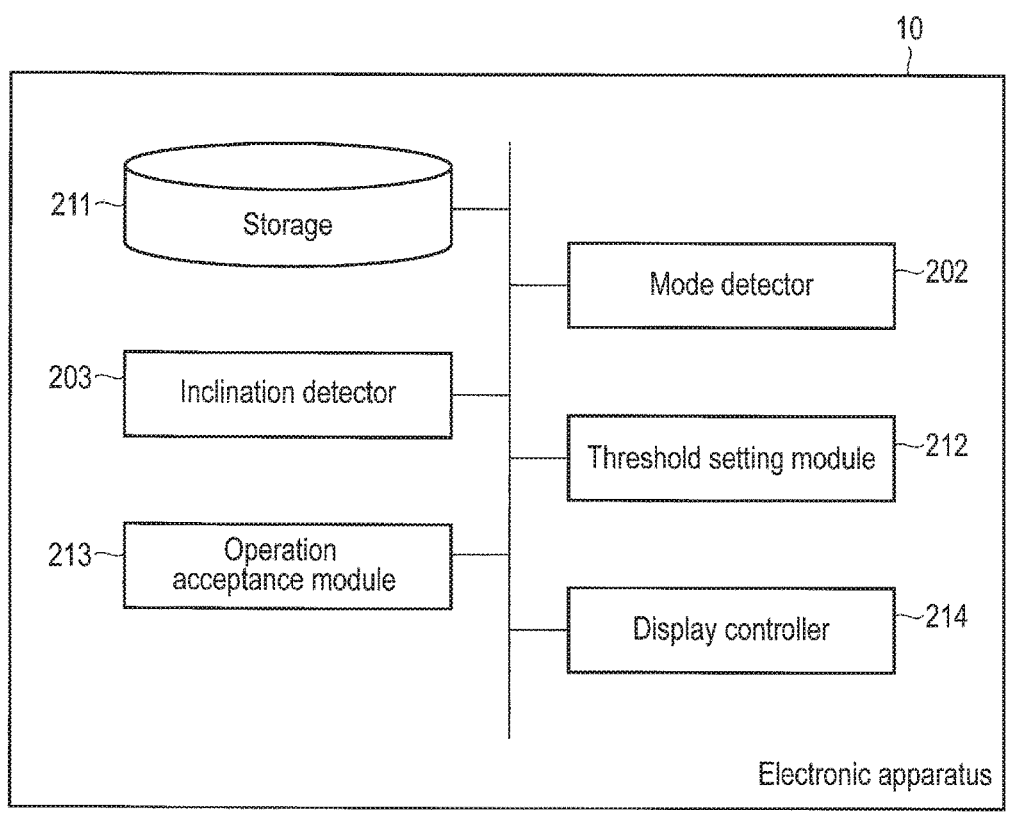
F I G. 12

ELECTRONIC APPARATUS AND METHOD

CROSS-REFERENCE TO RELATED APPLICATIONS

This application claims the benefit of U.S. Provisional Application No. 62/266,543, filed Dec. 11, 2015, the entire contents of which are incorporated herein by reference.

FIELD

Embodiments described herein relate generally to an electronic apparatus and a method.

BACKGROUND

Various electronic apparatuses, such as personal computers and tablet computers, are now common.

Further, in recent years, an electronic apparatus compatible with the modes of use of both a personal computer and a tablet computer has been developed.

Such an electronic apparatus includes a display unit in which a display including, for example, a touchpanel is provided on the front surface of the unit, and a base unit (keyboard dock) with a keyboard provided on the upper surface thereof. The display unit and the base unit are configured to be attachable to one another by a connector.

If the display unit and the base unit are attached to one another, the electronic apparatus can be used in a style (hereinafter, referred to as clam-shell mode) similar to a clam-shell (notebook) personal computer. On the other hand, if the display unit is detached from the base unit, the electronic apparatus can be used in a style (hereinafter, referred to as tablet mode) similar to a tablet computer.

There also exist an electronic apparatus in which the front surface (display) of the display unit is exposed, and the display unit can be attached to the base unit to cover the upper surface (keyboard) of the base unit with the back surface of the display unit. In this case, the electronic apparatus, with the display unit and the base unit superposed on each other as one body, can be used in a style (hereinafter, referred to as quasi-tablet mode) similar to a tablet computer.

If the electronic apparatus is used in tablet mode or quasi-tablet mode as described above, the orientation of a screen image (screen orientation) displayed on the display can be changed as in the case of a general tablet computer. The screen orientation is changed based on the inclination of the display unit detected by an acceleration sensor provided in the display unit.

Assume here that the electronic apparatus placed on, for example, a desk is used in tablet mode or quasi-tablet mode. In such a case, it is preferable to operate the electronic apparatus, kept on the desk. However, if, at this time, it is necessary to change the orientation of the screen image, the electronic apparatus must be raised and inclined. This operation is troublesome to a user.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 12 is a block diagram showing a functional configuration example of an electronic apparatus according to a second embodiment, which is associated with a screen rotation function.

DETAILED DESCRIPTION

Various embodiments will be described hereinafter with reference to the accompanying drawings.

In general, according to one embodiment, an electronic apparatus including a first body including a front surface on which a display is provided, and a first corner and a second corner, and a second body including an upper surface on which an input device is provided, and a third corner and a fourth corner is provided. The second body is mechanically attachable to the first body in a first style and a second style. The first and third corners correspond each other and the second and fourth corners correspond each other in the first style. The front surface is exposed and the first body and second body are closed, and the first and fourth corners correspond each other and the second and third corners correspond each other, in the second style. The electronic apparatus includes a memory and a hardware processor connected to the memory. The hardware processor is configured to detect whether the electronic apparatus is in the first or second style, and validate an operation of changing an orientation of a screen image displayed on the display and limit the validation of the operation to a certain time period during from a time of the second style being detected to a predetermined time passed.

First Embodiment

Figure 1:
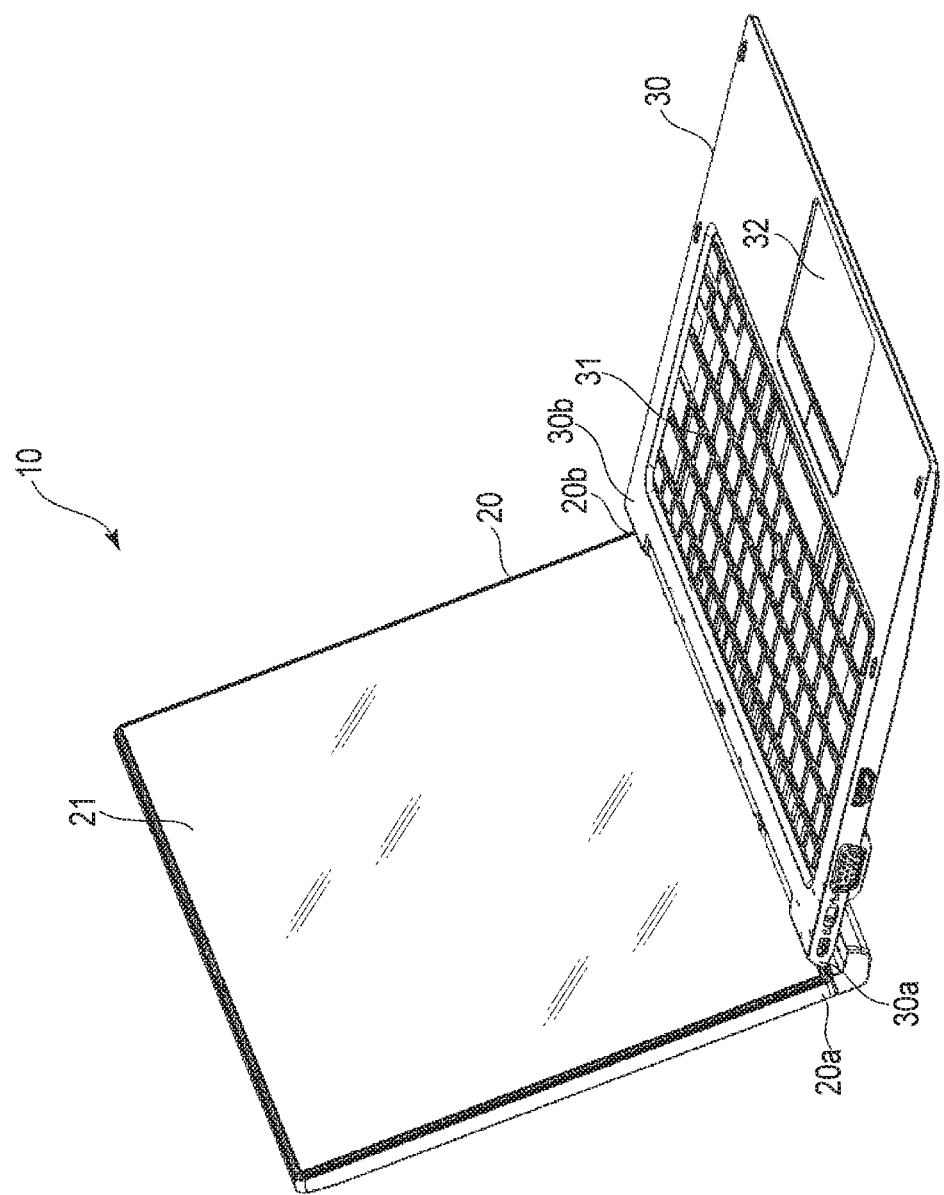
FIG. 1 is a perspective view showing an appearance example of an electronic apparatus according to a first embodiment.

A first embodiment will be described first. FIG. 1 is a perspective view showing an appearance example of an electronic apparatus according to the first embodiment.

As shown in FIG. 1, an electronic apparatus 10 includes a display unit 20 and a base unit 30.

The display unit 20 includes a thin rectangular body (first body) having a front surface with a touchscreen display 21 provided thereon. In the description below, the two lower corners (portions) of the display unit 20 will be referred to as corner (first corner) 20a and corner (second corner) 20b, far convenience sake.

The touchscreen display 21 incorporates a flat panel display and a sensor. The flat panel display may be a liquid crystal display (LCD), for example. The sensor is configured to detect the contact position of a finger (or stylus) on the screen of the flat panel display. As the sensor, an electrostatic capacitive touchpanel or an electromagnetic induction type digitizer may be used. In the description below, it is assumed that a touchpanel is incorporated in the touchscreen display 21.

The base unit 30 includes a thin rectangular body (second body) having an upper surface with an input device provided thereon. As shown in FIG. 1, a keyboard 31 and a touchpad 32 as the input device are arranged on the upper surface of the base unit 30. In the description below, the two rear corners (positions) of the base unit 30 will be referred to as corner (third corner) 30a and corner (fourth corner) 30b, for convenience sake.

The display unit 20 is connected (attached) to the base unit 30 so that it is rotatable between an open position in which the upper surface of the base unit 30 is exposed, and a closed position in which the upper surface of the base unit 30 is covered with the display unit 20.

Although FIG. 1 shows a state of the electronic apparatus 10 where the display unit 20 and the base unit 30 are attached to one another, the electronic apparatus 10 of the embodiment is configured such that the display unit 20 and the base unit 30 are detachable.

Figure 2:
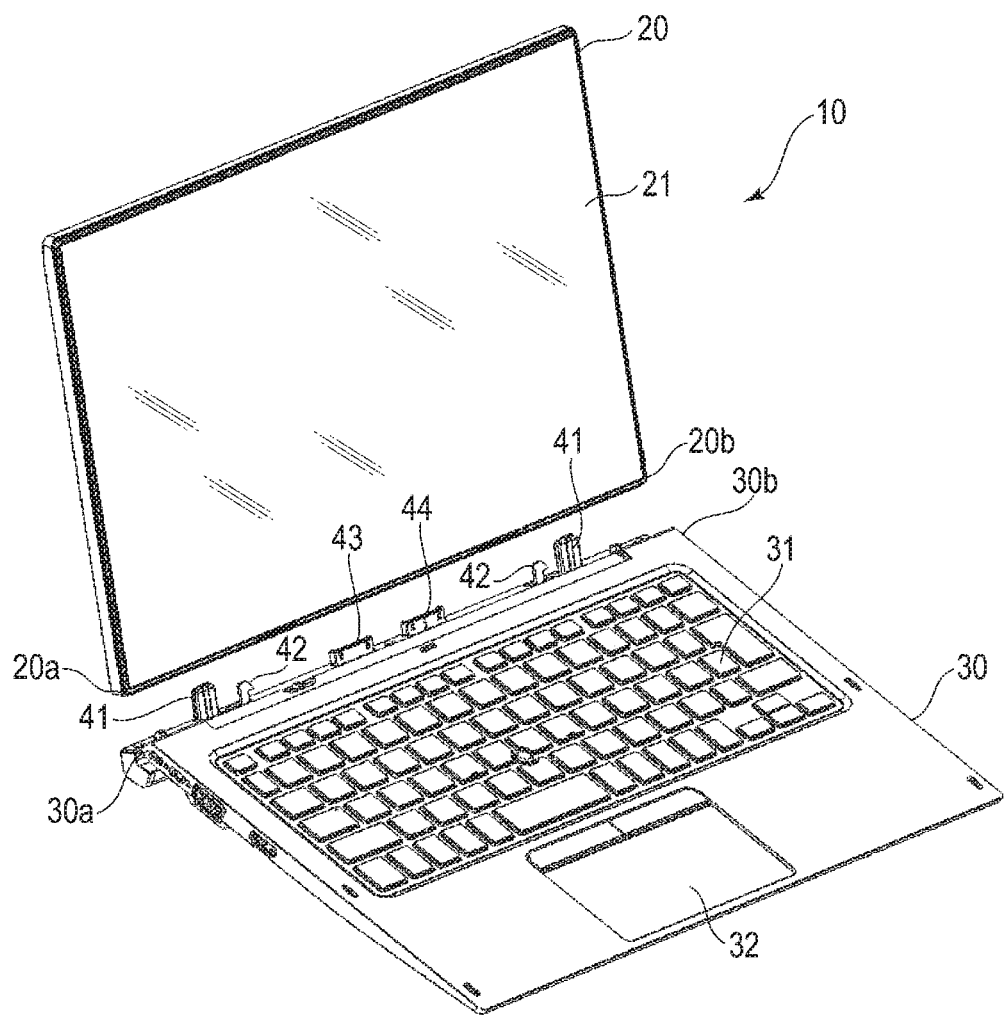
FIG. 2 is a perspective view showing a structure example of a base unit for attaching a display unit.

For instance, as shown in FIG. 2, the base unit 30 incorporates a pair of projections 41, a pair of hooks 42, and two connectors 43 and 44 for electrically connecting (the input device, for example, provided on the upper surface of) the base unit 30 to the display unit 20. The projections 41, the hooks 42, connectors 43 and 44, etc., enable the display unit 20 to be attached to and detached from the base unit 30.

Since, as described above, the display unit 20 and the base unit 30 are detachable, the electronic apparatus 10 of the embodiment can be used in a plurality of styles in accordance with the state of mutual attachment of the display unit 20 and the base unit 30.

More specifically, if the display unit 20 is separated from the base unit 30 as described above, the electronic apparatus 10 (namely, the display unit 20 itself) can be used in a style (hereinafter, referred to as tablet mode) like a tablet computer.

In contrast, if the display unit 20 is attached to the base unit 30 as shown in FIG. 1, the electronic apparatus 10 can be used in a style (hereinafter, referred to as clam-shell mode) like a clam-shell type (notebook type) personal computer. That is, the electronic apparatus 10 used in clam-shell mode (first style) is in a state where the display unit 20 and the base unit 30 are attached to one another, with corners 20a and 20b of the display unit 20 opposed (corresponding) to corners 30a and 30b of the base unit 30, respectively.

Figure 3:
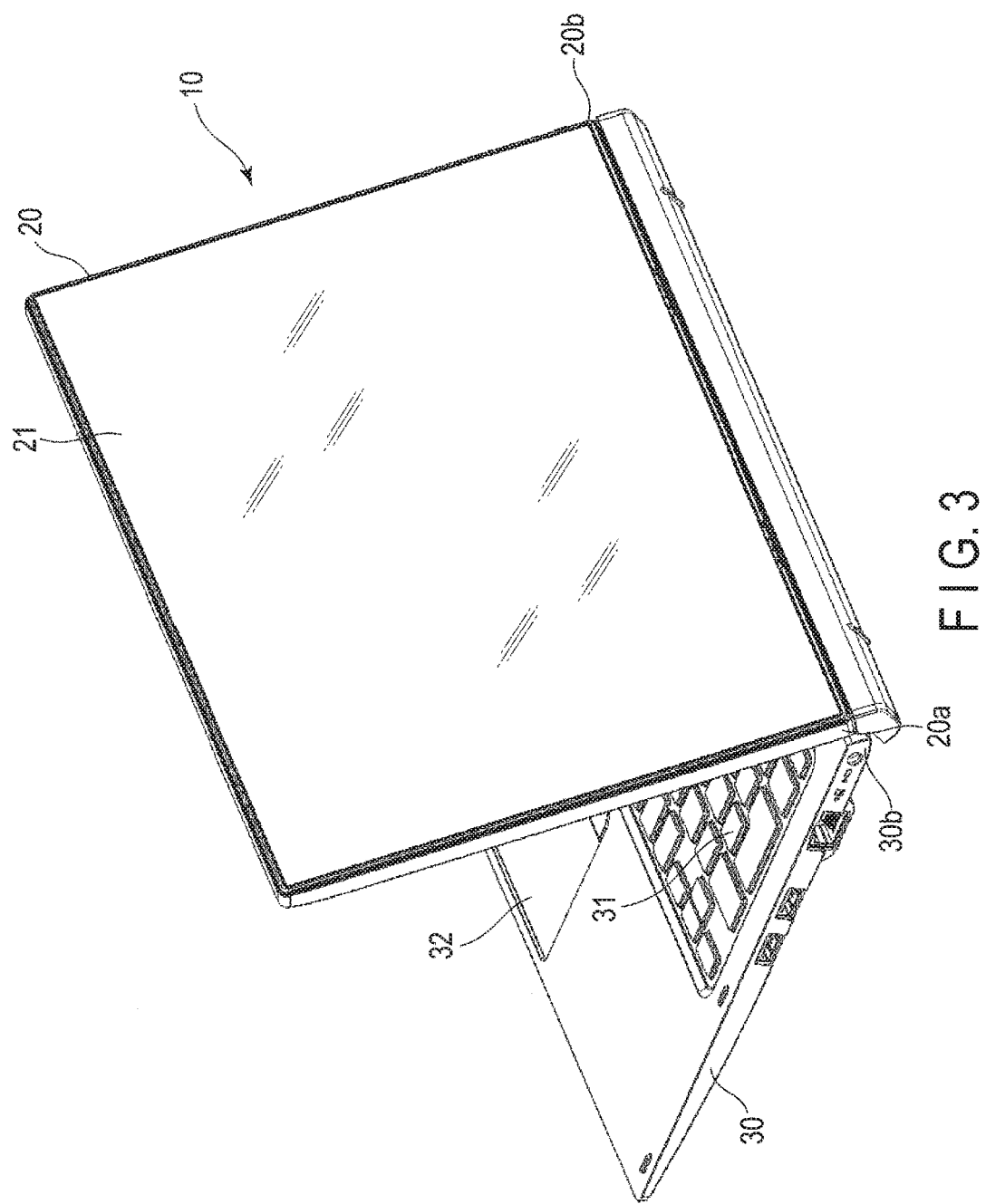
FIG. 3 is a view showing a state example where the display unit is turned back and attached to the base unit.
Figure 4:
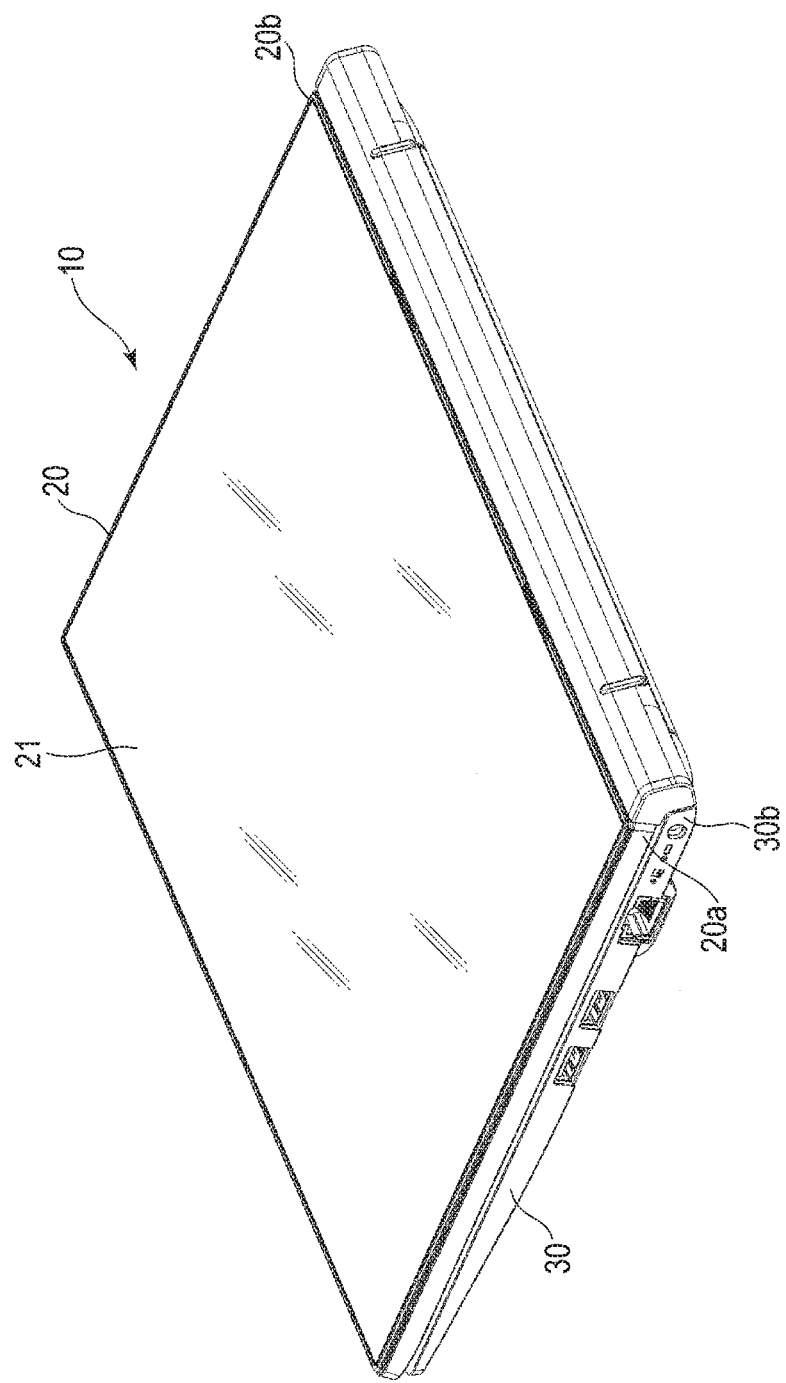
FIG. 4 is a perspective view showing an example of a form of the electronic apparatus used in quasi-tablet mode.

Further, in the electronic apparatus 10 of the embodiment, it is supposed that the display unit 20 can be attached to the base unit 30 such that the arrangement of the display unit 20 is laterally inverted with respect to that assumed if the electronic apparatus 10 is used in the clam-shell mode, as is shown in FIG. 3 (reverse docking). In other words, the display unit 20 can be connected to the base unit 30, reversed. In this respect, the electronic apparatus 10 is set in a style as shown in FIG. 4, in which the front surface of the display unit 20 is exposed, and the upper surface of the base unit 30 is covered with the back surface of the display unit 20 (that is, the display unit 20 and the base unit 30 are superposed on each other). The electronic apparatus 10 in this state, in which the display unit 20 and the base unit 30 are united, can be used in a style (hereinafter, referred to as quasi-tablet mode) like a tablet computer. The electronic apparatus 10 used in quasi-tablet mode (second style) assumes a state where the display unit 20 and the base unit 30 are closed, with corners 20a and 20b of the display unit 20 opposed (corresponding) to corners 30b and 30a of the base unit 30, respectively, and with the front surface of the display unit 20 exposed.

Assume here that it can be detected by connectors 43 and 44 whether the electronic apparatus 10 is used in clam-shell mode or in quasi-tablet mode.

More specifically, the display unit 20 and the base unit 30 are attached to each other through two connectors (not shown) incorporated in the display unit 20, and connectors 43 and 44 incorporated in the base unit 30. However, assume that only one of connectors 43 and 44 electrically connects the display unit 20 to the base unit 30. Depending upon which one of the two connectors of the base unit 30 electrically connects the base unit 30 to the display unit 20, it can be detected whether the electronic apparatus 10 is used in clam-shell mode or in quasi-tablet mode.

Assume here that connector 43 of the base unit 30 electrically connects the display unit 20 and the base unit 30. If the electronic apparatus 10 is used in clam-shell mode, a connector of the display unit 20 provided in a position corresponding to connector 43 of the base unit 30, and the other connector of the display unit 20 provided in a position corresponding to connector 44 of the base unit 30, will be hereinafter referred to as a first connector and a second connector, respectively.

In this case, if the display unit 20 is electrically connected to the base unit 30 through connector 43 and the first connector, it is detected that the electronic apparatus 10 is used in clam-shell mode. In contrast, if the display unit 20 is electrically connected to the base unit 30 through connector 43 and the second connector, it is detected that the electronic apparatus 10 is used in quasi-tablet mode (that is, the display unit 20 is attached so that, in comparison with notebook mode, it is laterally inverted).

The electronic apparatus 10 used in quasi-tablet mode is in a state where the display unit 20 and the base unit 30 are superposed on each other, with the front surface of the display unit 20 exposed. Assume that it can be detected, using, for example, a proximity sensor (not shown), whether the display unit 20 and the base unit 30 are superposed. The proximity sensor is, for example, a magnetic sensor, an infrared sensor or a capacitance sensor.

Figure 5:
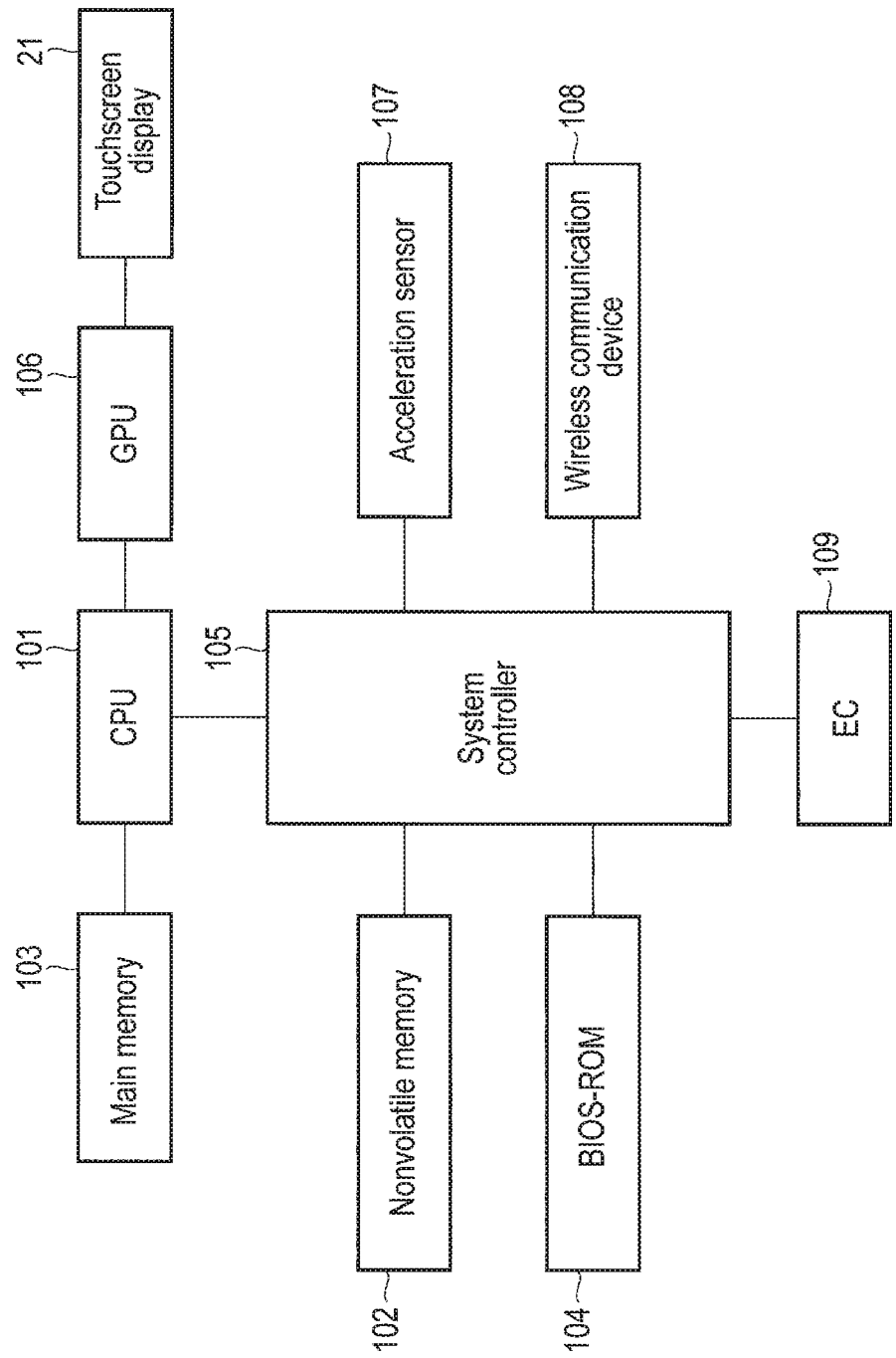
FIG. 5 is a block diagram showing a hardware configuration example of the electronic apparatus.

FIG. 5 shows a hardware configuration of the electronic apparatus 10. Referring to FIG. 5, the hardware configuration of the display unit 20 of the electronic apparatus 10 will be mainly described.

The electronic apparatus 10 includes, in addition to the touchscreen display 21 shown in, for example, FIG. 1, a CPU 101, a nonvolatile memory 102, a main memory 103, a BIOS-ROM 104, a system controller 105, a graphics processing unit (GPU) 106, an acceleration sensor 107, a wireless communication device 108, an embedded controller (EC) 109, etc.

The CPU 101 is a hardware processor for controlling the operations of various components in the electronic apparatus 10. The hardware processor includes at least one processing circuit. The CPU 101 executes various computer programs loaded from the nonvolatile memory 102 as storage into the main memory 103. These programs include an operating system (OS), various utility programs, various application programs, etc.

The CPU 101 also executes a basic input/output system (BIOS) stored in the BIOS-ROM 104. The BIOS is a program for hardware control.

The system controller 105 is a device that connects the local bus of the CPU 101 to various components.

The GPU 106 controls the touchscreen display 21 used as the display monitor of the electronic apparatus 10. Under control of the GPU 101, various screen images are displayed on the touchscreen display 21. The GPU 106 may be built in the CPU 101.

The acceleration sensor 107 is a sensor configured to measure acceleration exerted on the display unit 20. The acceleration (for example, gravitational acceleration) measured by the acceleration sensor 107 can be used to detect the inclination of (the electronic apparatus 10 including) the display unit 20. The proximity sensor (not shown) is also connected to the system controller 105.

The EC 109 execute power management for turning on or off the electronic apparatus 10.

The electronic apparatus 10 of the embodiment can be used in the above-described quasi-tablet mode as shown in FIG. 4. A description will be given of the orientation of a screen image displayed on the display unit 20 (touchscreen display 21) when the electronic apparatus is used in quasi-tablet mode.

Specifically, a description will be given of a case where the electronic apparatus 10 is used, shifted from clam-shell mode currently set as shown in FIG. 1, to quasi-tablet mode.

Figure 6:
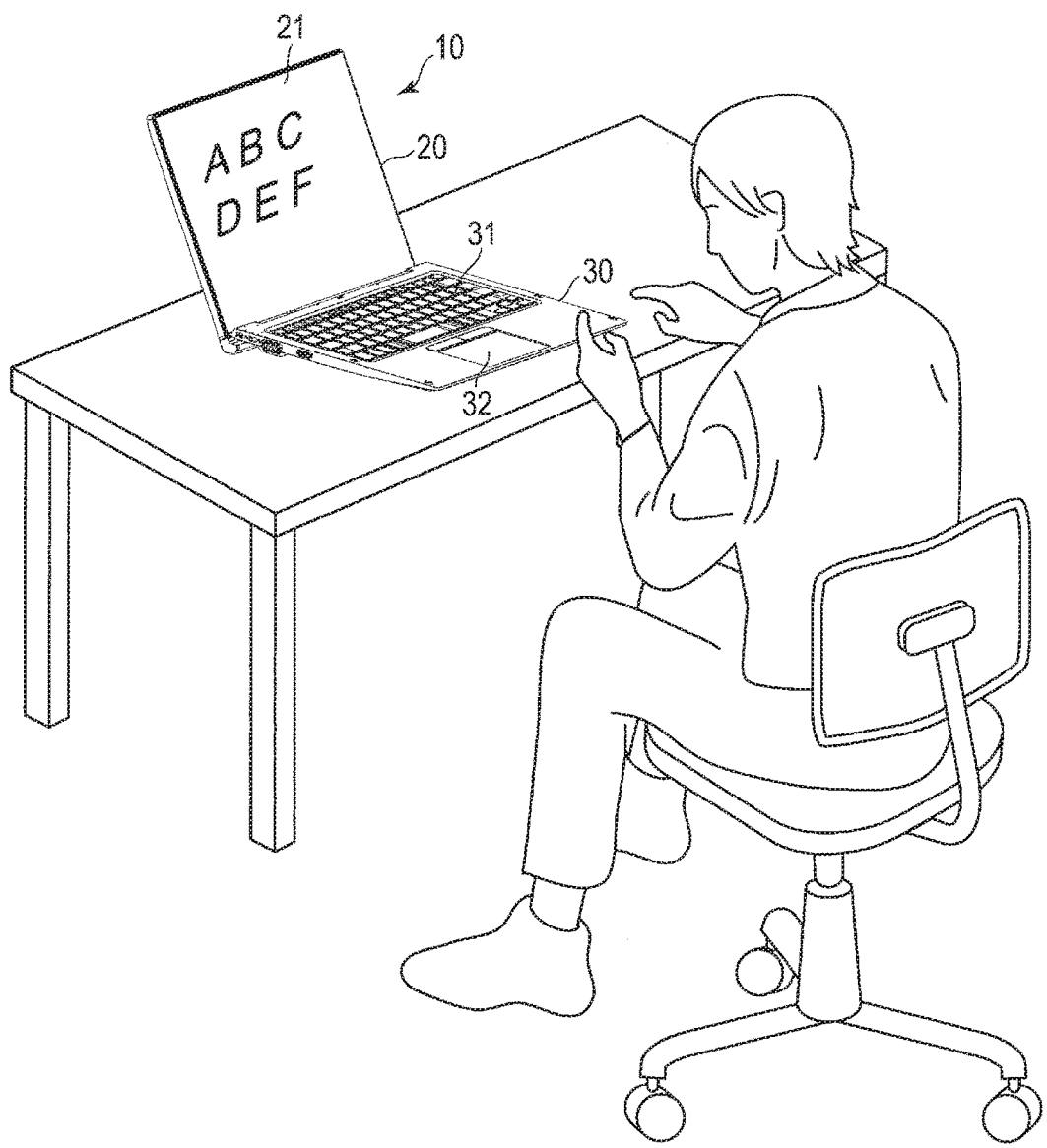
FIG. 6 is a view for explaining an example of a use situation of the electronic apparatus when clam-shell mode is changed to quasi-tablet mode.

In clam-shell mode, a user uses the electronic apparatus 10 in a position as shown in FIG. 6. At this time, a screen image is displayed on the touchscreen display 21 (display unit 20) in an orientation (hereinafter, referred to as an appropriate orientation for the user) in which the user can easily recognize, for example, characters as shown in FIG. 6.

Figure 7:
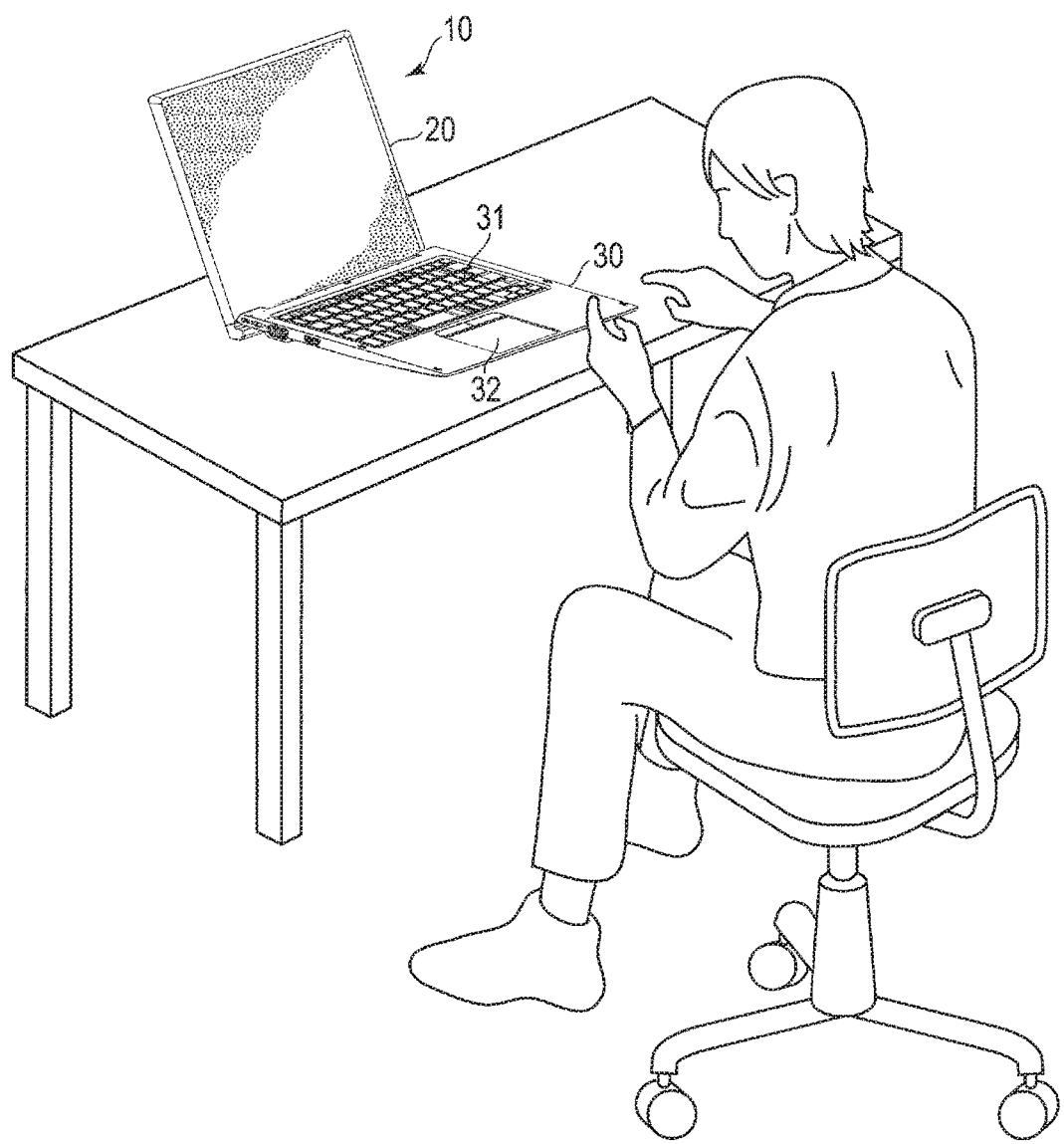
FIG. 7 is a view for explaining an example of a use situation of the electronic apparatus when clam-shell mode is changed to quasi-tablet mode.

In this state, to use the electronic apparatus 10 in quasi-tablet mode, the user detaches the display unit 20 from the base unit 30, laterally inverts the display unit 20 by rotating it about the vertical axis, and again attaches it to the base unit 30, as is shown in FIG. 7. By downwardly superposing the thus-attached display unit 20 on the base unit 30, the user can use the electronic apparatus 10 in quasi-tablet mode.

Figure 8:
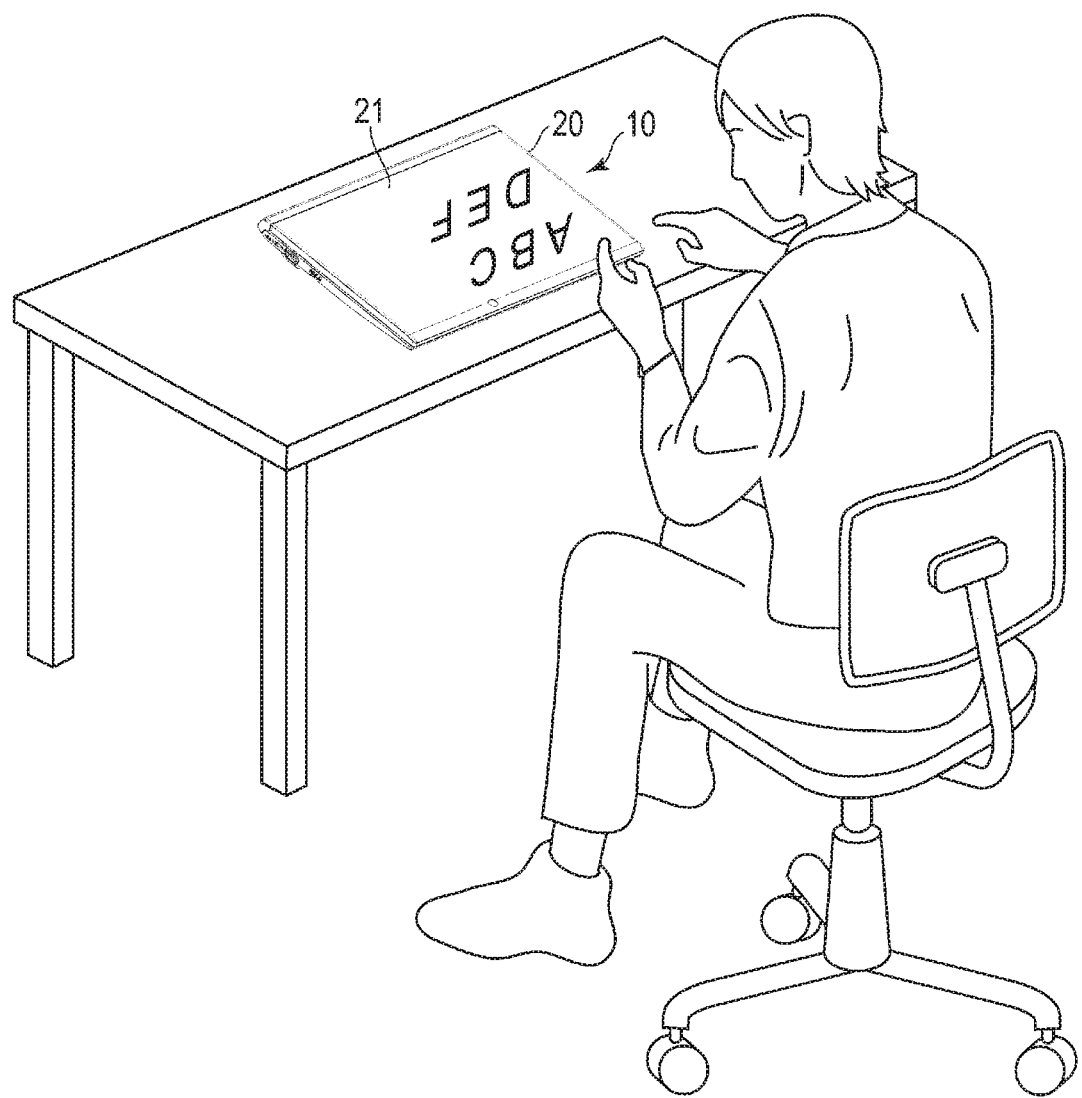
FIG. 8 is a view for explaining an example of a use situation of the electronic apparatus when clam-shell mode is changed to quasi-tablet mode.

At this time, however, the orientation of a screen image displayed on the touchscreen display 21 is opposite to that appropriate for the user, as is shown in FIG. 8.

In view of this, the electronic apparatus 10 has a function of changing the orientation of the screen image in accordance with, for example, the inclination of (the electronic apparatus 10 having) the display unit 20. This function enables the user to change the orientation of the screen image displayed on the touchscreen display 21 to an orientation appropriate for the user by inclining the electronic apparatus 10 toward the user through a degree greater than a predetermined degree after changing the electronic apparatus 10 from clam-shell mode to quasi-tablet mode.

However, as aforementioned, it is very troublesome for the user to incline the electronic apparatus 10 toward the user when they change the mode from clam-shell mode to quasi-tablet mode and use the electronic apparatus 10, in a state where the electronic apparatus 10 is kept placed on the desk.

In view of the above, the electronic apparatus 10 is made to have a function (hereinafter, referred to as a screen rotation function) of enabling the user to easily changing (i.e., rotating the screen image in an arbitrary direction) the orientation of the screen image displayed on the touchscreen display 21 by a user's predetermined operation when, for example, the electronic apparatus 10 is used in quasi-tablet mode.

Figure 9:
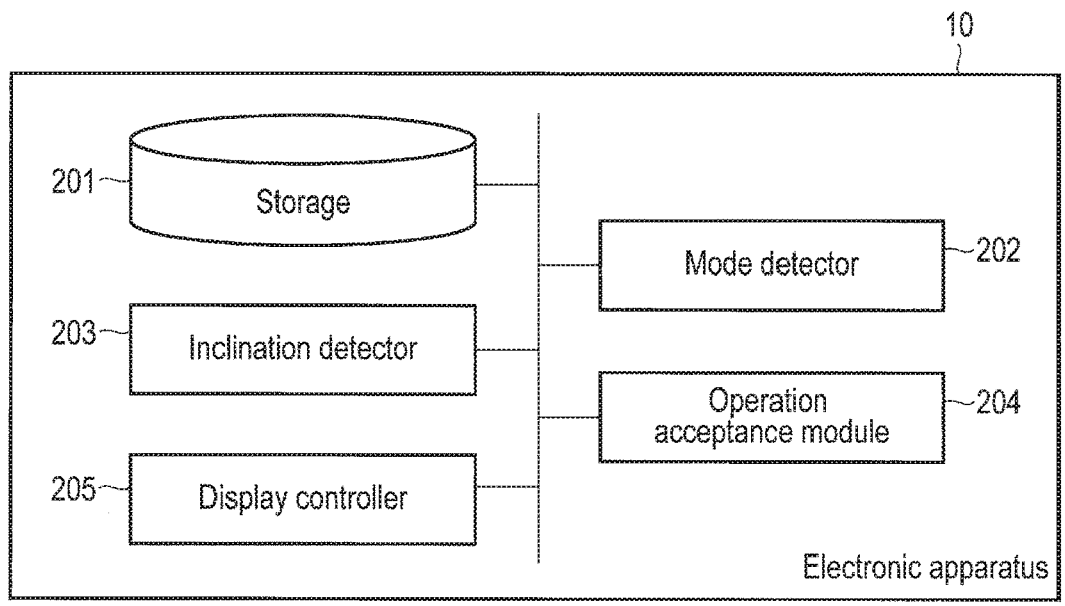
FIG. 9 is a block diagram showing a functional configuration example of the electronic apparatus associated with a screen rotation function.

Referring now to FIG. 9, a description will be given of a functionality configuration of the electronic apparatus 10 associated with the screen rotation function.

As shown in FIG. 9, the electronic apparatus 10 includes a storage 201, a mode detector 202, an inclination detector 203, an operation detector 204, and a display controller 205.

In the embodiment, the storage 201 is assumed to be stored in, for example, the above-mentioned nonvolatile memory 102. Further, a part or all of the mode detector 202, the inclination detector 203, the operation acceptance module 204, and the display controller 205 are functional modules realized when the CPU 101 (the computer of the electronic apparatus 10) executes a program (software), for example. These modules 202 to 205 may be realized by hardware, such as an integrated circuit (IC), or by a combination of software and hardware.

Furthermore, programs for realizing a part or all of the modules 202 to 205 may be installed in the computer of the electronic apparatus 10 through a computer-readable storage medium storing the program.

The storage 201 pre-stores data (hereinafter, referred to as operation defining data) that defines an operation (hereinafter, referred to as a screen rotation operation) for changing the orientation of a screen image in association with the screen rotation function. It is assumed that the operation definition data of the embodiment defines, for example, a predetermined operation for the touchscreen display 21 (touchpanel).

The mode detector 202 detects the mode in which the electronic apparatus 10 is used, in accordance with the state of connection of the display unit 20 and the base unit 30. The modes detected by the mode detector 202 include the aforementioned tablet mode, clam-shell mode and quasi-tablet mode.

The inclination detector 203 detects the inclination of (the display unit 20 included in) the electronic apparatus 10, using the acceleration sensor 107. The inclination detector 203 detects the inclination (angle) of the display unit 20 based on the direction, with respect to the display unit 20, of gravitational acceleration measured by the acceleration sensor 107.

The operation acceptance module 204 accepts a screen rotation operation based on the operation defining data stored in the storage 201.

If the operation acceptance module 204 has accepted a screen rotation operation, the display controller 205 performs control for changing the orientation of the screen image displayed on the touchscreen display 21 based on the screen rotation operation.

Figure 10:
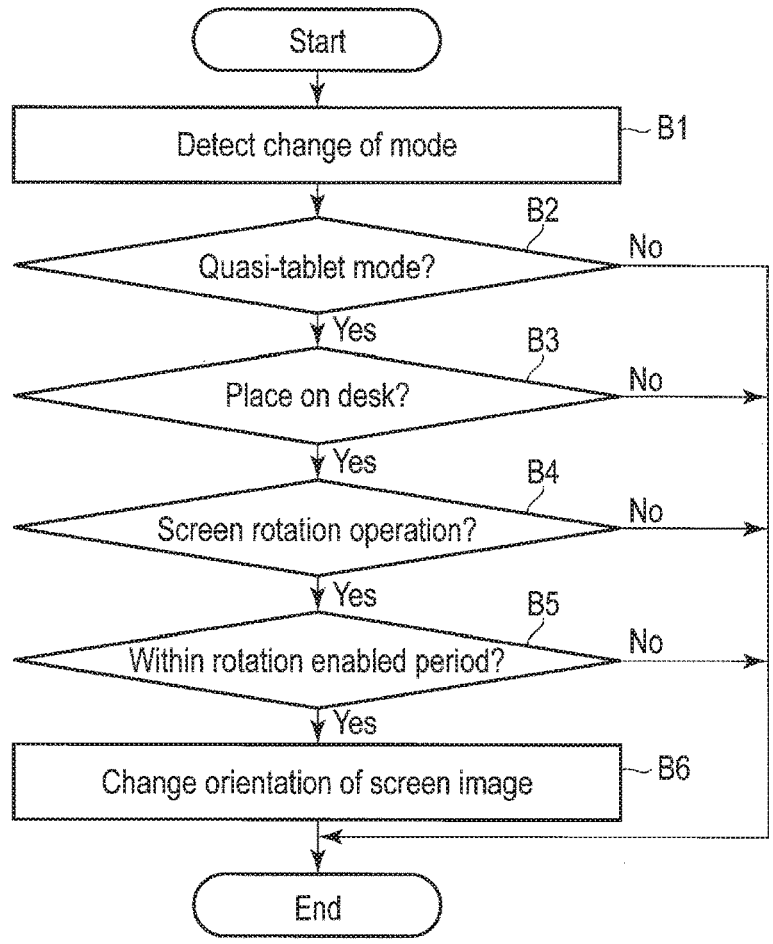
FIG. 10 is a flowchart showing a procedure example of processing performed by the electronic apparatus to change the orientation of a screen using the screen rotation function.

Referring then to FIG. 10, a description will be given of a procedure of processing performed by the electronic apparatus 10 when changing the orientation of the screen image using the screen rotation function of the embodiment.

Assume here that the operation defining data stored in the storage 201 defines, as the screen rotation operation, an operation of, for example, double-tapping a predetermined position on the touchscreen display 21 (touchpanel) corresponding to an orientation of the screen image to be change.

In the embodiment, the mode detector 202 can detect (confirm) the mode in which the electronic apparatus 10 is used, by monitoring the state of connection of the display unit 20 and the base unit 30 through the connectors incorporated in the display unit 20, and connectors 43 and 44 of the base unit 30.

That is, the mode detector 202 can detect the change of mode (namely, the style of using the electronic apparatus 10) in accordance with (the change of) the connection state of the display unit 20 and the base unit 30 (block B1).

If the change of mode has been detected, the mode detector 202 determines whether the mode after the change is quasi-tablet mode (block B2).

Even if, for example, the electronic apparatus 10 is used in quasi-tablet mode, if it is not placed on, for example, a desk, but is gripped by the user, the screen image can be displayed relatively easily in a desired orientation by inclining the electronic apparatus 10 as described above.

Therefore, it is assumed in the embodiment that the screen rotation function is enabled when the electronic apparatus 10 having its mode changed to quasi-tablet mode is placed on, for example, the desk.

In view of the above, if the mode after the change is determined to be quasi-tablet mode as described above (YES in block B2), the inclination detector 203 determines whether the electronic apparatus 10 is placed on the desk, based on the inclination of the electronic apparatus 10 detected by the acceleration sensor 107 (block B3).

In the embodiment, the inclination detector 203 determines that the electronic apparatus 10 is placed on the desk, if, for example, the inclination of the electronic apparatus 10 detected by the inclination detector 203 is not greater than a predetermined value (for example, 10°).

If it is determined that the electronic apparatus 10 is placed on the desk (YES in block B3), the operation acceptance module 204 determines whether the user has performed the screen rotation operation (in this case, the operation of double-tapping a predetermined position on the touchscreen display 21) defined in the operation defining data stored in the storage 201 (block B4).

If it is determined that the user has performed the screen rotation operation (YES in block B4), the operation acceptance module 204 accepts the screen rotation operation.

Subsequently, the operation acceptance module 204 determines whether the screen rotation operation is detected within a predetermined period (for example, 10 seconds) after (the change to) quasi-tablet mode is detected (block B5). In the description below, a predetermined period elapsing after the detection of quasi-tablet mode (that is, a certain time period during from a time of the second style being detected to a predetermine time passed) will be referred to as a rotation enabled period.

If it is determined that the screen rotation operation is accepted within the rotation enabled period (YES in block B5), the display controller 205 rotates the screen image, displayed on the touchscreen display 21, in accordance with the screen rotation operation to thereby change the orientation of the screen image (block B6).

The screen rotation operation of the embodiment will now be described. Assume that the screen rotation operation is an operation of double-tapping a predetermined position on the touchscreen display 21 as described above, and that the user can designate, by the screen rotation operation, the orientation of the screen image displayed on the touchscreen display 21. Specifically, the user can designate one of the upper, lower, right and left sides of the touchscreen display 21, by double-tapping a position close to the one side. In this case, the display controller 205 determines that the user is seeing the screen image from a direction corresponding to the one side of the touchscreen display 21 designated by the user, thereby changing the orientation of the screen image to an orientation appropriate for the user (that is, changing the orientation so that the tapped portion is set as the front side).

Figure 11:
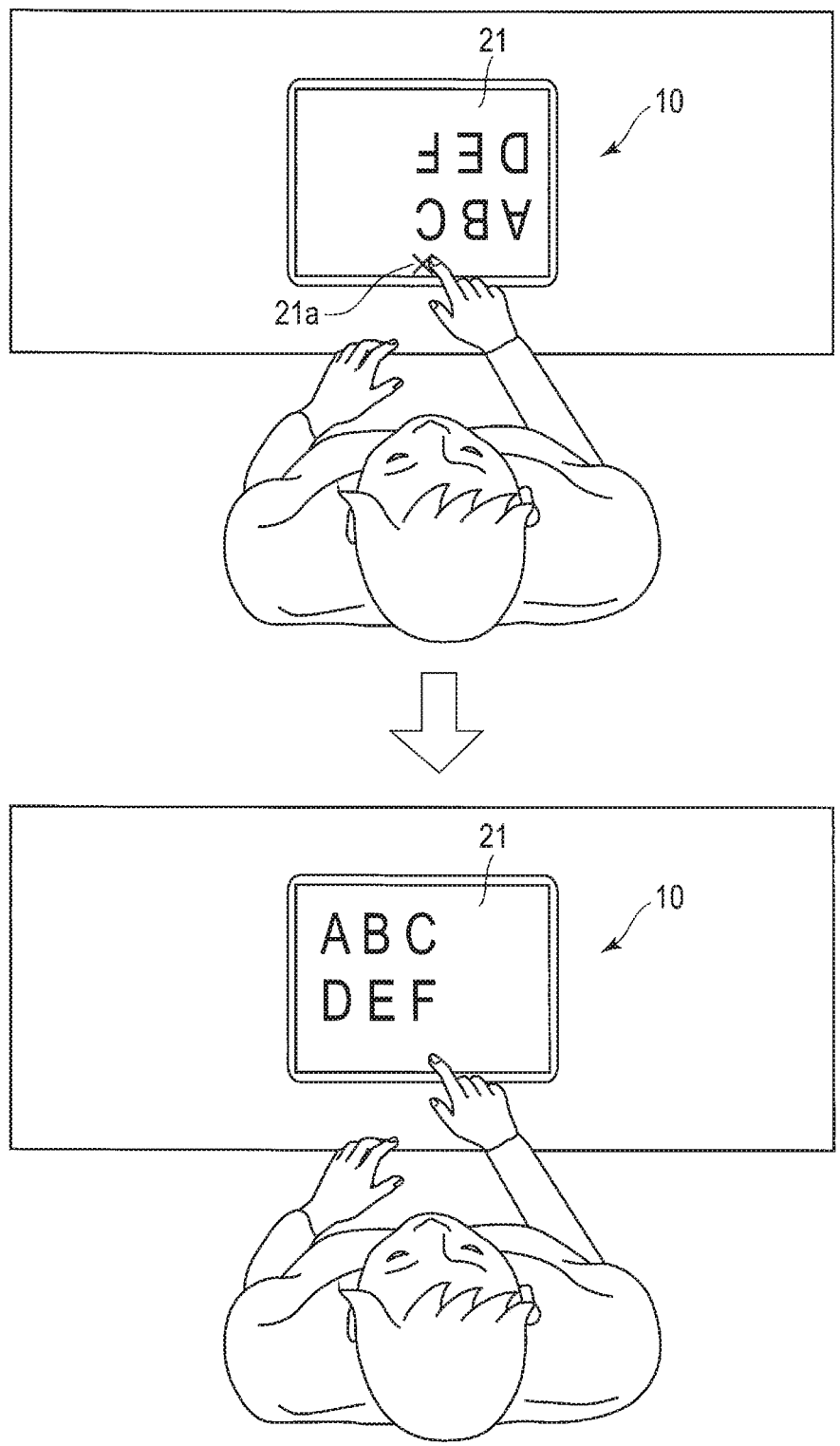
FIG. 11 is a view for explaining a specific example of a screen rotation operation.

By virtue of the above-described screen rotation operation, when the user intends to use the electronic apparatus 10 in quasi-tablet mode, even if the screen image is displayed thereon in an orientation inappropriate for the user, it can be rotated to an orientation appropriate for the user if the user double-taps (for the screen rotation operation), for example, a position 21a on the touchscreen display 21 close to the user, as is shown in FIG. 11. Since the screen rotation operation is an operation of tapping twice, it can be discriminated from other operations (for example, an operation of tapping once) on the touchscreen display 21.

For instance, a guide (not shown in FIG. 11) associated with the screen rotation operation may be displayed on the touchscreen display 21 while the screen rotation operation is valid (that is, during a rotation enabled period). For example, icons indicating the positions in which the user should tap twice in order to designate each side of the touchscreen display 21, and a message indicating that the screen rotation operation is enabled, may be displayed on the touchscreen display 21.

Returning to FIG. 10, if it is determined that the mode changed in block B2 is not quasi-tablet mode (NO in block B2), the processing shown in FIG. 11 is finished. Similarly, if it is determined that the electronic apparatus 10 is not placed on the desk (NO in block B3), if it is determined that the user has not performed the screen rotation operation (NO in block B4), or if it is determined that the screen rotation operation is not accepted within the rotation-enabled period (NO in block B5), the processing shown in FIG. 11 is finished.

That is, in the embodiment, if the display mode is changed from a certain mode to quasi-tablet mode, the screen rotation operation (screen rotation function) is validated in a rotation enabled period. In other words, within the rotation enabled period, the user can change, by the screen rotation operation, the orientation of a screen image currently displayed on the touchscreen display 21.

Although FIG. 10 shows a case where processing is finished after block B6 is executed, this processing may be modified such that the screen rotation operation can be performed two or more times within the rotation enabled period. In this case, after executing block B6, the procedure may be repeated from block B4. Further, the number of the screen rotation operations that can be performed within the rotation enabled period may be set by the user.

Further, the above-described screen rotation operation is an example, and may not designate a side of the touchscreen display 21. For instance, the screen image may be clockwise (or counterclockwise) rotated through 90° whenever a screen rotation operation (operation of tapping twice) is performed on the touchscreen display 21.

The screen rotation operation may also be modified such that the orientation (for example, the rotational angle) of the screen image is designated in accordance with the number of times of tapping by the user on the touchscreen display 21. For example, it may be modified such that if the touchscreen display 21 is double-tapped, the screen image is clockwise rotated through 90°, if tapping is made three times on the touchscreen display 21, the screen image is clockwise rotated through 180°, and if tapping is made four times on the touchscreen display 21, the screen image is clockwise rotated through 270°.

The screen rotation operation may be other than the tapping operation (e.g., may be a swipe operation or a flick operation).

As described above, in the embodiment, the style (mode) in which the electronic apparatus 10 is used is detected based on the connection state of the display unit 20 (first body) and the base unit 30 (second body), and an operation (screen rotation operation) for changing the orientation of the screen image displayed on the touchscreen display 21 is validated until a predetermined time elapses after a predetermined style (second style) in which the electronic apparatus 10 is used is detected. In other words, the validation of the operation is limited to a certain time period during from a time of the second style being detected to a predetermined time passed.

More specifically, in the embodiment, the screen rotation operation is validated if quasi-tablet mode is detected, in which mode the display unit 20 is attached to the base unit 30 in such a positional relationship that the front surface (namely, the touchscreen display 21) of the display unit 20 is exposed, and the upper surface (namely, the keyboard, the touchpad, etc.) of the base unit 30 is covered with the back surface of the display unit 20, and if the inclination detected by the acceleration sensor 107 is not higher than a predetermined value (that is, if the electronic apparatus 10 is placed on, for example, a desk).

In the embodiment, the above structure enables the user to easily change (set) the orientation of the screen image without an operation of raising and inclining the electronic apparatus 10, if the electronic apparatus 10 placed on, for example, a desk is used in quasi-tablet mode.

Further, since in the embodiment, the screen rotation operation includes an operation of designating the orientation of the screen image with respect to the touchscreen display 21 (touchpanel), the screen image can be oriented as the user wishes.

Furthermore, the embodiment is configured to display, on the touchscreen display 21, a guide associated with the screen rotation operation, if quasi-tablet mode is detected, and if the inclination detected by the acceleration sensor 107 is not higher than a predetermined value. By virtue of this structure, the embodiment enables the user to easily grasp, for example, a position on the touchscreen display 21 in which the screen rotation operation should be performed, and a period in which the screen rotation operation is permitted.

Although in the embodiment, the screen rotation operation is validated if the electronic apparatus 10 is used in quasi-tablet mode, even in tablet mode, the electronic apparatus 10 may be used, placed on a desk, as in quasi-tablet mode. Also in this case, to change the orientation of the screen image, it is troublesome to the user to raise and incline the electronic apparatus 10 (display unit 20) in order to change the orientation of the screen image. Therefore, the embodiment may also be applied to a case where the electronic apparatus 10, which is placed on, for example, a desk, is used in tablet mode.

Second Embodiment

A second embodiment will now be described. An electronic apparatus according to the second embodiment is realized as a computer that can be used in clam-shell mode, tablet mode, and quasi-tablet mode, as in the above-described first embodiment. Referring again to FIGS. 1 to 5, the appearance, for example, of the electronic apparatus according to the second embodiment will be described. Further, since the system configuration of the electronic apparatus of the second embodiment is also similar to that of the first embodiment, it will be described referring to FIG. 6, if necessary.

As described above, the electronic apparatus 10 has a function (hereinafter, referred to as a standard function) of changing the orientation of a screen image in accordance with, for example, the inclination of the display unit 20. In this standard function, thresholds (hereinafter, referred to as standard thresholds) for changing the orientation of a screen image displayed on the touchscreen display 21 are pre-set. The thresholds include an angular threshold and a time threshold. To change the orientation of the screen image by the standard function, the user must keep, for a period not shorter than the time threshold, inclining the display unit 20 with an angle not less than the angular threshold.

In light of this, it is assumed that the electronic apparatus 10 of the second embodiment has a function (screen rotation function) of changing the orientation of a screen image with a smaller orientation (angle) and a shorter time than the standard thresholds (angular and time thresholds) set in the standard function, if the electronic apparatus 10 is placed on, for example, a desk, and is used in quasi-tablet mode.

Referring then to FIG. 12, a description will be given of the functionality configuration of the electronic apparatus 10 associated with the screen rotation function of the second embodiment. In FIG. 12, elements similar to those of FIG. 9 are denoted by corresponding reference numbers, and no detailed description will be given thereof. In the description below, elements different from those of FIG. 9 will be mainly described.

As shown in FIG. 12, the electronic apparatus 10 includes a storage 211, a threshold setting module 212, an operation acceptance module 213, and a display controller 214. In the second embodiment, the storage 211 is supposed to be stored in, for example, the nonvolatile memory 102. Further, a part or all of the threshold setting module 212, the operation detector 213, and the display controller 214 are functional parts realized when, for example, the CPU 101 executes a program (software). These elements 212 to 214 may be realized by hardware, such as an integrated circuit, or by a combination of software and hardware.

The storage 211 stores thresholds (hereinafter, referred to as dedicated thresholds) for changing the orientation of a screen image displayed on the touchscreen display 21. The dedicated thresholds stored in the storage 211 are values different from the above-described standard thresholds and include an angular threshold and a time threshold. The angular threshold included in the dedicated thresholds is set to a value (angle of inclination) lower than the angular threshold included in the standard thresholds. Similarly, the time threshold included in the dedicated thresholds is set to a value lower than the time threshold included in the standard thresholds.

The threshold setting module 212 sets dedicated thresholds based on the mode detected by the mode detector 202 and the inclination of the display unit 20 detected by the mode/inclination detector 203.

The operation acceptance module 213 accepts an operation (screen rotation operation) of changing the orientation of the screen image in the screen rotation function of the second embodiment, based on the dedicated thresholds set by the threshold setting module 212. The screen rotation operation accepted by the operation acceptance module 213 includes an operation of inclining the display unit 20 (electronic apparatus 10).

The display controller 214 performs control of changing the orientation of the screen image displayed on the touchscreen display 21, based on the screen rotation operation, if the operation acceptance module 213 has accepted the screen rotation operation.

Referring then to the flowchart of FIG. 13, a description will be given of the processing procedure of the electronic apparatus 10 for changing the orientation of the screen image, using the above-described screen rotation function of the second embodiment.

Assume here that the above-described standard thresholds (angular threshold and time threshold) in the standard function are set. In this case, the user can change the orientation of the screen image displayed on the touchscreen display 21, by inclining the display unit 20 by an angle not less than the angular (inclination) threshold included in the standard thresholds, and maintaining the inclined state for a period not less than the time threshold included in the standard thresholds.

First, blocks B11 to B13 corresponding to blocks B1 to B3 shown in FIG. 11 are executed.

If it is determined in block B13 that the electronic apparatus 10 is placed on a desk (YES in block B13), the threshold setting module 212 changes the above-described standard thresholds set in the standard function to the dedicated thresholds stored in the storage 211 (block B14).

If the standard thresholds have been changed to the dedicated thresholds as described above, the operation acceptance module 213 accepts, as the screen rotation operation, an operation of, for example, inclining the electronic apparatus 10 toward the user, based on the dedicated thresholds.

In this case, the operation acceptance module 213 determines whether the inclination of the electronic apparatus 10 detected by the acceleration sensor 107 is greater than the angular threshold (inclination) included in the dedicated thresholds (block B15).

If it is determined that the inclination of the electronic apparatus 10 is greater than the angular threshold (YES in block B15), the operation detector 213 determines whether the state in which the electronic apparatus 10 is inclined by an angle greater than the angular threshold is kept for a period not less than the time threshold included in the dedicated thresholds (block B16).

If it is determined that the state in which the electronic apparatus 10 is inclined by an angle greater than the angular threshold is kept for a period not less than the time threshold (YES in block B16), the operation acceptance module 213 accepts the screen rotation operation.

Next, the operation acceptance module 213 determines whether the screen rotation operation has been detected within a rotation enabled period (for example, within 10 seconds after quasi-tablet mode is detected) (block B17).

If it is determined that the screen rotation operation has been detected within the rotation enabled period (YES in block B17), the display controller 205 rotates the screen image, currently displayed on the touchscreen display 21, in accordance with the screen rotation operation, thereby changing the orientation of the screen image (block B18).

That is, in the second embodiment, if an operation (a screen rotation operation of inclining the electronic apparatus 10 toward the user) that at least satisfies (the angular and time thresholds included in) the dedicated thresholds within the rotation enabled period has been accepted, the orientation of the screen image displayed on the touchscreen display 21 is changed in an orientation appropriate for the user.

If block B18 has been executed, the threshold setting module 212 cancels the change of the thresholds in block B14 (block B19). In other words, the threshold setting module 212 changes (returns), to the standard thresholds, the dedicated thresholds set in block B14.

Figure 13:
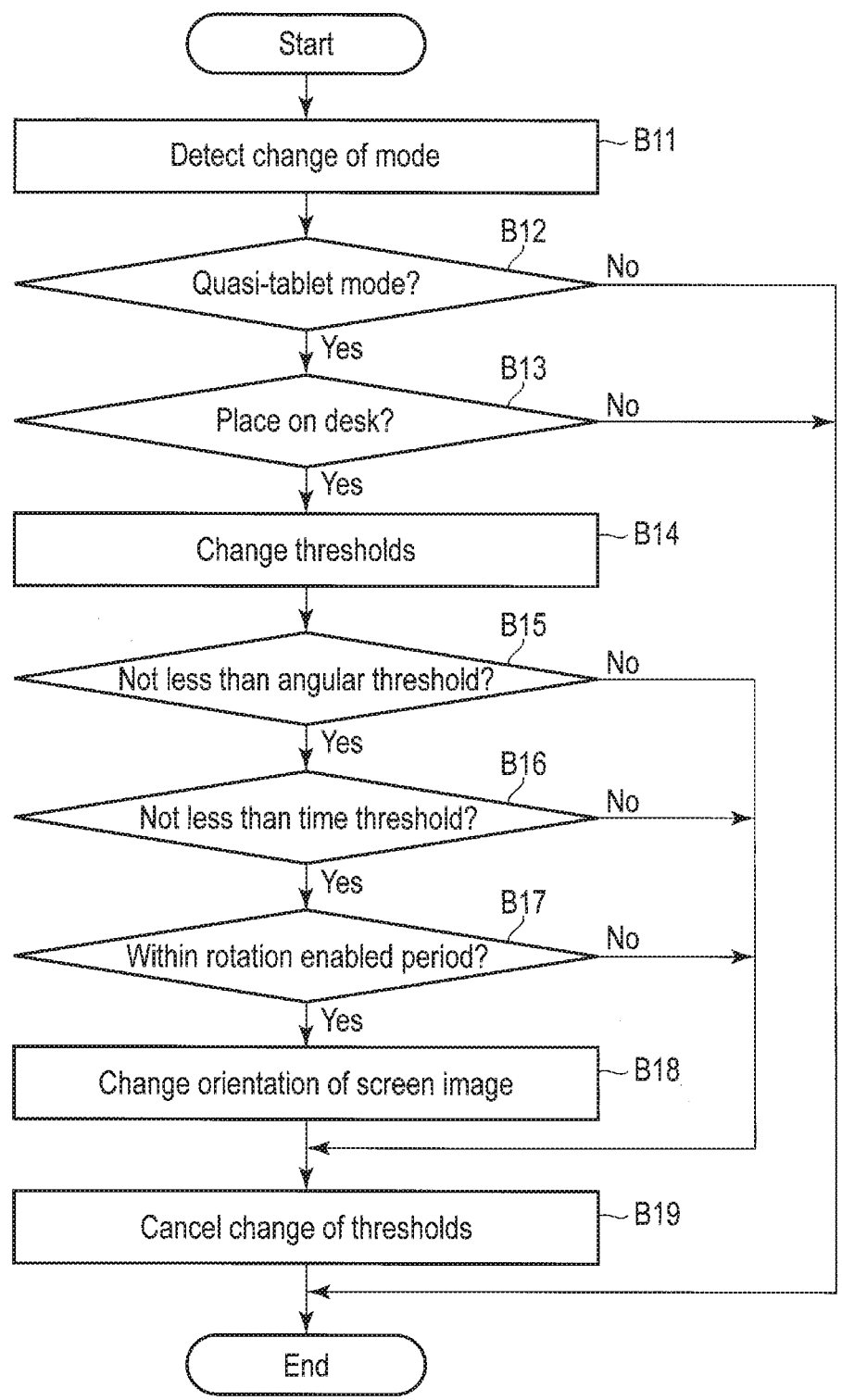
FIG. 13 is a flowchart showing a procedure example of processing performed by the electronic apparatus of the second embodiment to change the orientation of a screen using the screen rotation function.

If it is determined in block B12 that the mode after the mode change is not quasi-tablet mode (NO in block B12), the processing shown in FIG. 13 is finished. Similarly, if it is determined in block B13 that the electronic apparatus 10 is not placed on the desk (NO in block B13), the processing shown in FIG. 13 is finished.

In contrast, if it is determined in block B15 that the inclination of the electronic apparatus 10 is not greater than the angular threshold (NO in block B15), block B19 is executed. Similarly, if it is determined in block B16 that the state in which the electronic apparatus 10 is inclined by an angle greater than the angular threshold is not kept for a period not less than the time threshold (NO in block B17), block B19 is executed.

Although FIG. 13 shows a case where block B19 is executed after the execution of block B18 in order to avoid user's unintentional change of the orientation of the screen image, this may be modified such that the screen rotation operation can be repeatedly performed within the rotation enabled period, with the dedicated thresholds fixed.

As described above, in the second embodiment, the standard thresholds in the standard function are changed to dedicated thresholds, if quasi-tablet mode is detected where the front surface (namely, the touchscreen display 21) of the display unit 20 is exposed and the display unit 20 and the base unit 30 are attached to one another with the upper surface of the base unit 30 (namely, the keyboard, the touchpad, etc.) covered with the back surface of the display unit 20, and if the inclination detected by the acceleration sensor 107 is not higher than a predetermined value (that is, if the electronic apparatus 10 is placed on a desk). The angular threshold (third inclination) included in the dedicated thresholds is less than the angular threshold (second inclination) included in the standard thresholds. Similarly, the time threshold (second time period) included in the dedicated thresholds is less than the time threshold (third time period) included in the standard thresholds.

In this structure, the orientation of the screen image displayed on the touchscreen display 21 is changed if the inclination (first inclination) of the electronic apparatus 10 is not less than the angular threshold included in the dedicated thresholds, and a state in which the inclination of the electronic apparatus 10 is greater than the angular threshold is maintained for a period not shorter than the time threshold included in the dedicated thresholds.

Assume here that the angular threshold and the time threshold included in the standard thresholds are 60° and several seconds, respectively. In contrast, assume that the angular threshold and the time threshold included in the dedicated thresholds are 30° and a period less than 1 second, respectively. In the second embodiment, the sensitivity for the change (rotation) of the orientation of the screen image can be enhanced by changing the standard thresholds to the dedicated thresholds. In other words, in the second embodiment, when using the electronic apparatus 10 placed on, for example, the desk in quasi-tablet mode, the orientation of the screen image can be easily changed with a smaller inclination of the device 10 and a shorter-time screen rotation operation of the device 10 (namely, a shorter-time operation of inclining the electronic apparatus 10) than in the case of using the standard thresholds.

Although in the second embodiment, both the angular threshold and the time threshold are changed, this may be modified such that, for example, at least the angular threshold or the threshold is changed. Even in this structure, user's troublesomeness to change the orientation of the screen image can be reduced, compared to the case of using the standard thresholds.

Moreover, in the second embodiment, a guide associated with the screen rotation operation, whose description is omitted herein, may be displayed on the touchscreen display 21, as in the above-described first embodiment.

Further, the second embodiment may be applied to the case of using the electronic apparatus 10 placed on, for example, the desk, in tablet mode.

In at least one of the above-described embodiments, if the electronic apparatus 10 is used in a particular style, the orientation of the screen image can be easily changed.

Each of the functions described in the embodiments may be realized by a circuit (processing circuit). The processing circuit may include, for example, a programmed hardware processor, such as a central processing unit (CPU). This processor executes each of the described functions by executing a computer program (a group of commands) stored in the memory. The processor may be a microprocessor including an electrical circuit. The processing circuit may also include, for example, a digital signal processor (DSP), an application-specific integrated circuit (ASIC), a microcontroller, a controller, and other electronic circuit components. Each of the components other than the CPU, which are described in the embodiment, may also be realized by a processing circuit.

Furthermore, various types of processing in the embodiment can be realized by computer programs. Accordingly, the same advantage as in the embodiment can be obtained simply by installing the computer program in a computer through a computer-readable storage medium storing the program, and executing the same.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus including a first body that comprises a front surface on which a display is provided, and a first corner and a second corner, and a second body that comprises an upper surface on which an input device is provided, and a third corner and a fourth corner, the first body and the second body being mechanically attachable to support an arrangement of the electronic apparatus for use in a first style or a second style, the first style being used to place the electronic device apparatus in a notebook mode in which the first and third corners are positioned opposite to each other and the second and fourth corners are positioned opposite to each other, the second style being used to place the electronic apparatus in a quasi-tablet mode in which a back surface of the display of the first body covers the upper surface of the second body, the electronic apparatus comprising:

a processor configured to control an orientation of a screen image displayed on the display according to the first style and the second style; and an acceleration sensor communicatively coupled to the processor, the acceleration sensor is configured to detect an inclination of the first body, wherein the processor is configured to:
  detect that the electronic apparatus is placed in the second style and validate an input operation of changing an orientation of the screen image displayed on the display if the inclination detected by the acceleration sensor is not greater than a certain value, and
  restrict the validation of the input operation to a certain time period extending from a time of the second style being detected to a predetermined time passed.

2. The electronic apparatus of claim 1, wherein
the display comprises a touchpanel; and
the input operation comprises an operation of designating a rotation operation of the screen image with respect to the touchpanel.

3. The electronic apparatus of claim 2, wherein if the input operation is validated, the processor is configured to display, on the display, a guide associated with the rotation operation.

4. The electronic apparatus of claim 1, wherein
the processor is communicatively coupled to the acceleration sensor and changes the orientation of the screen image displayed on the display if a first inclination of the first body detected by the acceleration sensor is greater than or equal to a second inclination for changing the orientation of the screen image displayed on the display.

5. The electronic apparatus of claim 4, wherein
responsive to the arrangement of the electronic apparatus being in the second style and the inclination detected by the acceleration sensor is less than or equal to the certain value, the second inclination is changed to a third inclination less than the second inclination until the predetermined time passes.

6. The electronic apparatus of claim 1, further comprising a plurality of connectors for electrically connecting the first body and the second body, wherein
the processor determines that the arrangement of the electronic apparatus is in the first style if the first body and the second body are connected by a first connector of the plurality of connectors, and determines that the arrangement of the electronic apparatus is in the second style if the first body and the second body are connected by a second connector of the plurality of connectors.

7. A method to be performed by an electronic apparatus comprising a first body that comprises a front surface on which a display is provided, and a first corner and a second corner, and a second body that comprises an upper surface on which an input device is provided, and a third corner and a fourth corner, the first body and the second body being mechanically attachable to support an arrangement of the electronic apparatus for use in a first style that corresponds to a notebook mode where the first and third corners are positioned opposite to each other and the second and fourth corners are positioned opposite to each other or a second style that correspond to a quasi-tablet mode in which the upper surface of the second body is covered with a back surface of the display of the first body, the electronic apparatus includes a processor configured to control an orientation of a screen image displayed on the display according to the first style and the second style, and an acceleration sensor configured to detect an inclination of the first body, the method comprising:
- detecting the arrangement of the electronic apparatus being in the second style;
- validating an input operation of changing an orientation of the screen image displayed on the display in response to (i) the electronic apparatus being detected to be in the second style and (ii) the inclination detected by the acceleration sensor is not greater than a certain value; and
- restricting the validation of the input operation to a certain time period extending from a time of the second style being detected to a predetermined time passed.

8. The method of claim 7, wherein
the display comprises a touchpanel; and
the input operation comprises an operation of designating a rotation operation of the screen image with respect to the touchpanel.

9. The method of claim 8, wherein if the input operation is valid, the display displays a guide associated with the rotation operation.

10. The method of claim 7, wherein the orientation of the screen image displayed on the display is changed if a first inclination of the first body detected by the acceleration sensor is greater than or equal a second inclination for changing the orientation of the screen image displayed on the display.

11. The method of claim 10, wherein the orientation of the screen image displayed on the display is changed, if a state in which the first inclination detected by the acceleration sensor is not less than the second inclination continues for a first period of time, and
- if the second inclination is changed to the third inclination, the first period of time is changed to a second period of time shorter than the first period of time.

12. The electronic apparatus of claim 5, wherein
the processor changes the orientation of the screen image displayed on the display, if a state in which the first inclination detected by the acceleration sensor is not less than the second inclination continues for a first period of time; and
if the second inclination is changed to the third inclination, the first period of time is changed to a second period of time shorter than the first period of time.

13. The method of claim 10, responsive to the arrangement of the electronic apparatus being in the second style and the inclination detected by the acceleration sensor is less than or equal to the certain value, the second inclination is changed to a third inclination less than the second inclination until the predetermined time passes.

14. An electronic apparatus including (i) a display unit that comprises a body having a front surface with a display, a back surface, a first corner and a second corner, and (ii) a base unit that comprises an upper surface on which an input device is provided, a third corner and a fourth corner, the display unit and the base unit being mechanically attachable to support an arrangement of the electronic apparatus for use in (a) a first style in which the electronic apparatus is placed in a notebook mode where the first and third corners are positioned opposite to each other and the second and fourth corners are positioned opposite to each other or (b) a second style in which the electronic apparatus is placed in a quasi-tablet mode in which the back surface of the body covers the upper surface of the base unit, the electronic apparatus comprising:
- a processor configured to control an orientation of a screen image displayed on the display according to the first style and the second style; and
- an acceleration sensor communicatively coupled to the processor, the acceleration sensor is configured to detect an inclination of the display unit,
wherein the processor is configured to detect that the electronic apparatus is in the second style and permit changing an orientation of the screen image displayed on the display if the inclination detected by the acceleration sensor is not greater than a certain value, and the validation of the input operation occurs within a predetermined time period extending from a time of detecting the arrangement of the electronic apparatus being in the second style.

15. The electronic apparatus of claim 14, wherein
the display comprises a touchpanel; and
the input operation comprises an operation of designating a rotation operation of the screen image with respect to the touchpanel.

16. The electronic apparatus of claim 14, wherein the processor changes the orientation of the screen image displayed on the display in response to the inclination detected by the acceleration sensor being not less than a second inclination for changing the orientation of the screen image displayed on the display.

17. The electronic apparatus of claim 14, further comprising a plurality of connectors for electrically connecting the display unit and the base unit, wherein
the processor determines that the arrangement of the electronic apparatus is in the first style if the display unit and the base unit are connected by a first connector of the plurality of connectors, and determines that the arrangement of the electronic apparatus is in the second style if the display unit and the base unit are connected by a second connector of the plurality of connectors.

* * * * *